Figure 5:
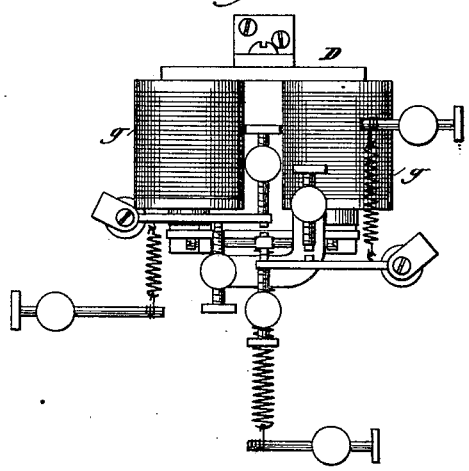

(No Model.)  12 Sheets—Sheet 1.
E. GRAY.
TELAUTOGRAPH.
No. 386,815.  Patented July 31, 1888.
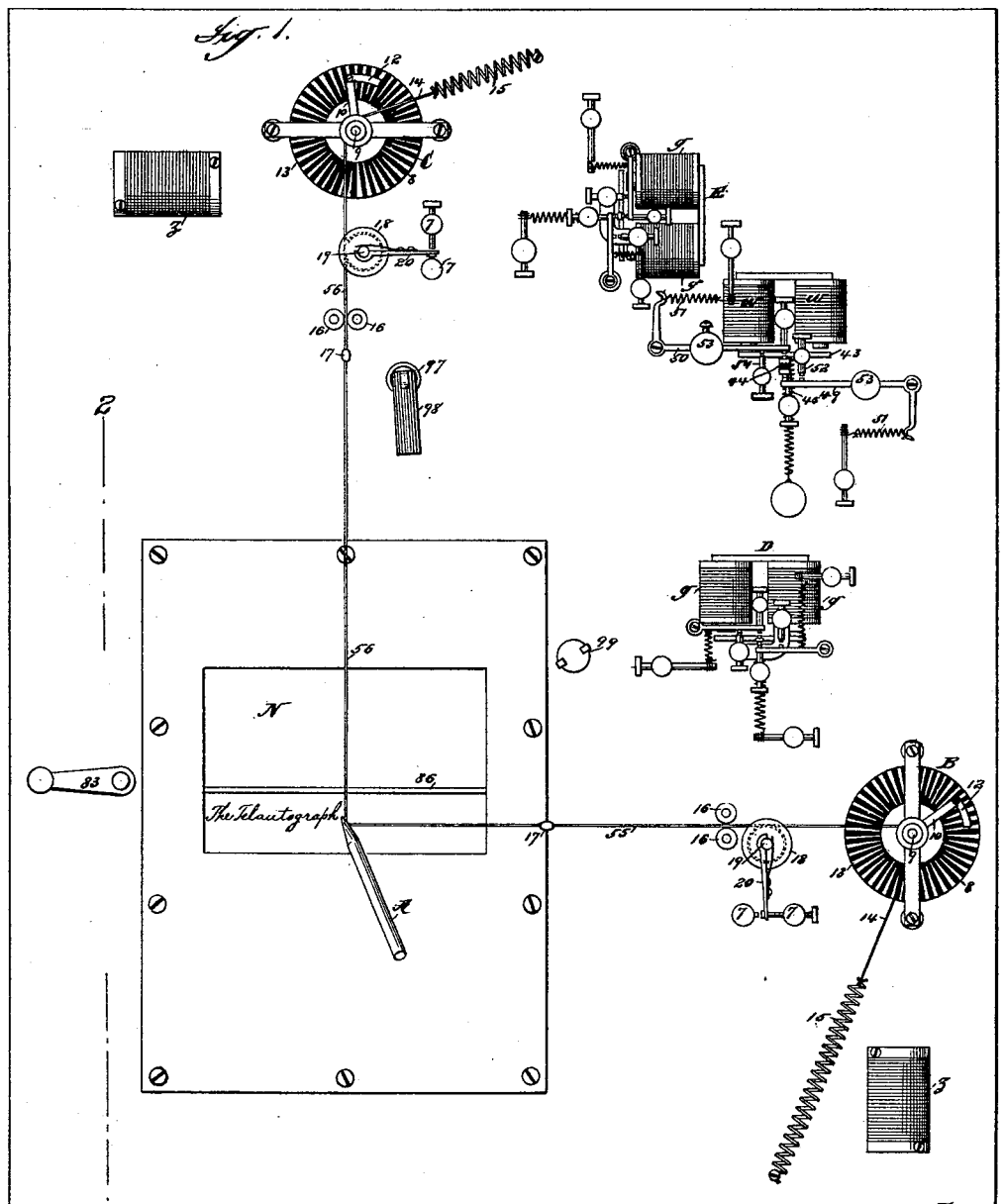
Attest:
Geo. H. Botts
J. J. Kennedy
Inventor:
Elisha Gray
by Philip Philips Hovey
Atty (No Model.) 12 Sheets—Sheet 2.
E. GRAY.
TELAUTOGRAPH.
No. 386,815. Patented July 31, 1888.
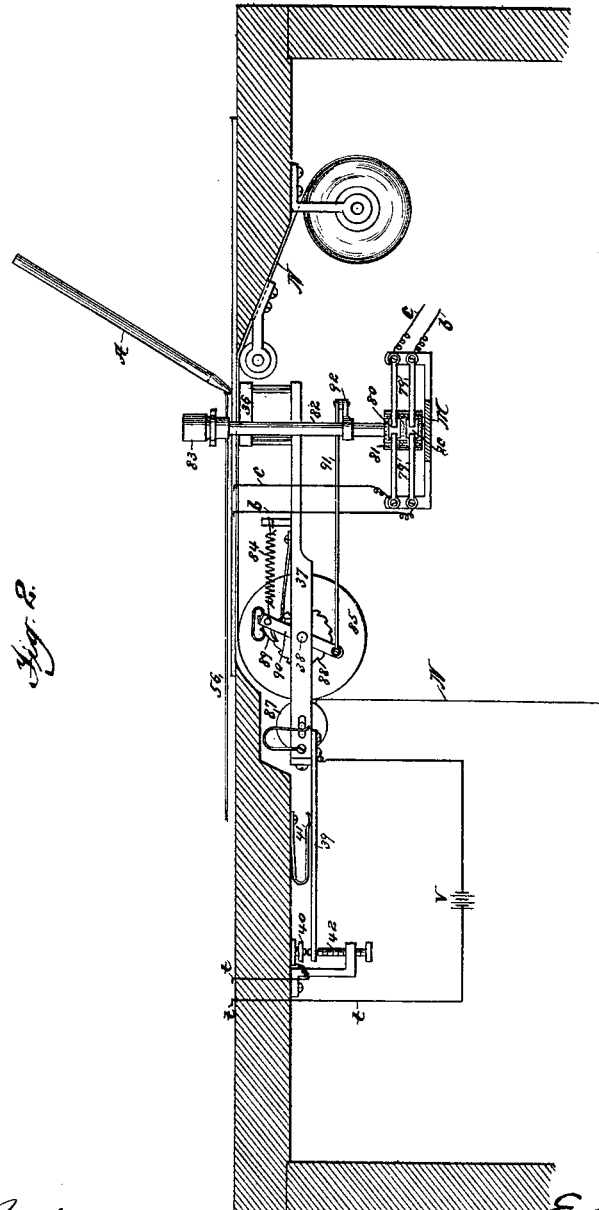
Attest
Geo. H. Botts
J. J. Kennedy
Inventor
Elisha Gray
Philipp & Philipp
Attys (No Model.)  
12 Sheets—Sheet 3.
E. GRAY.
TELAUTOGRAPH.
No. 386,815. Patented July 31, 1888.
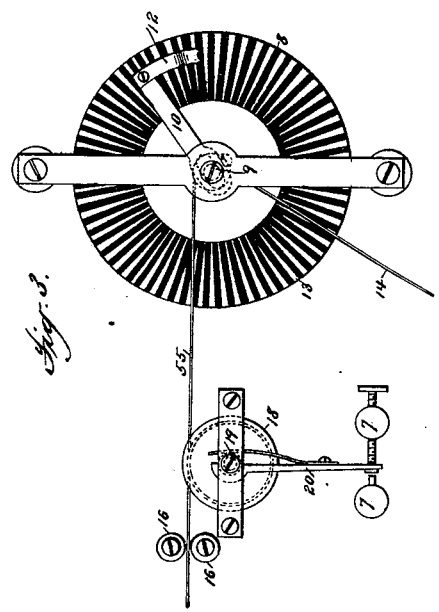
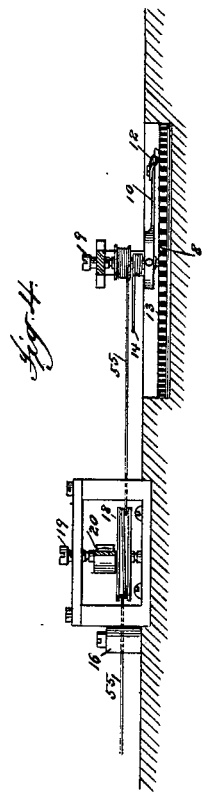
Attest:  
Geo. H. Bott  
J. J. Kennedy
Inventor:  
Elisha Gray  
by Philipp Phelps Hovey  
Attys (No Model.) 12 Sheets—Sheet 4.
E. GRAY.
TELAUTOGRAPH.

No. 386,815. Patented July 31, 1888.

Attest:
G. H. Botts
J. J. Kennedy

Inventor
Elisha Gray
by Philipp Philipps Avery
Attys (No Model.) 12 Sheets—Sheet 5.
E. GRAY.
TELAUTOGRAPH.
No. 386,815. Patented July 31, 1888.
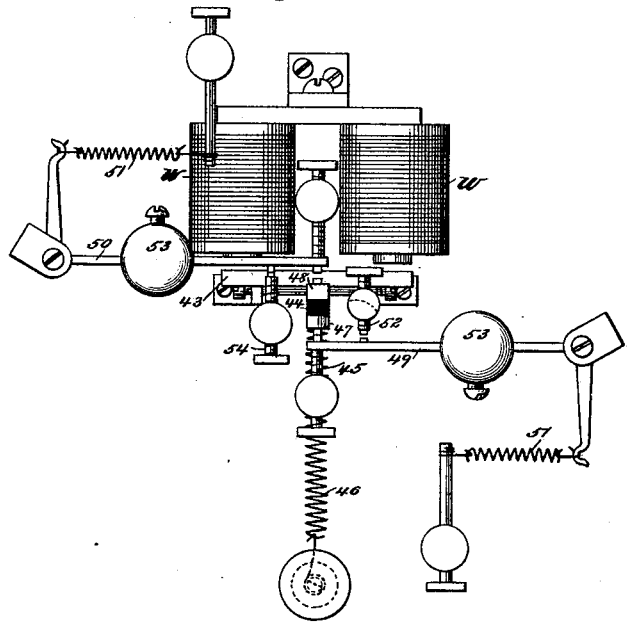
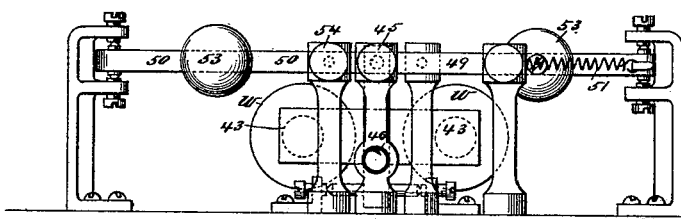

(No Model.) 12 Sheets—Sheet 6.
E. GRAY.
TELAUTOGRAPH.
No. 386,815. Patented July 31, 1888.
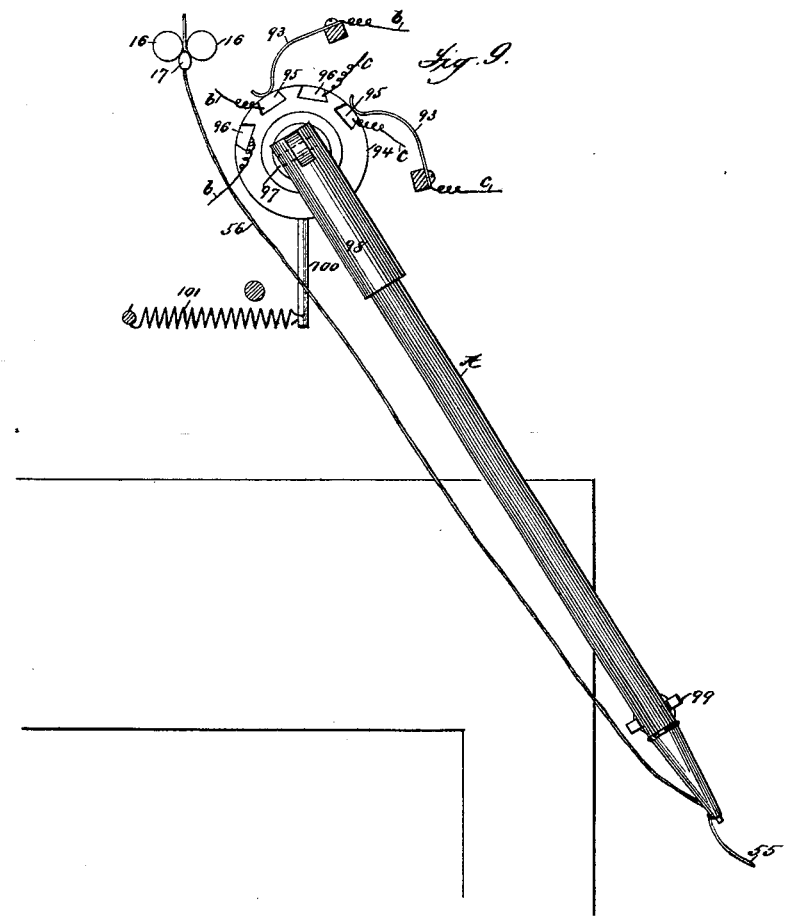
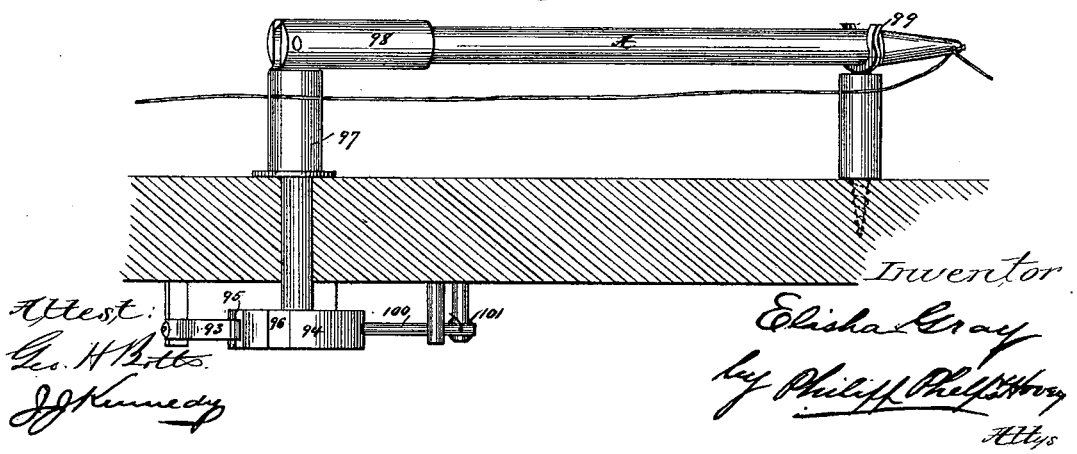
Inventor
Elisha Gray
by Philipp Phelps Hoey
Att'ys (No Model.) 12 Sheets—Sheet 7.
E. GRAY.
TELAUTOGRAPH.
No. 386,815. Patented July 31, 1888.
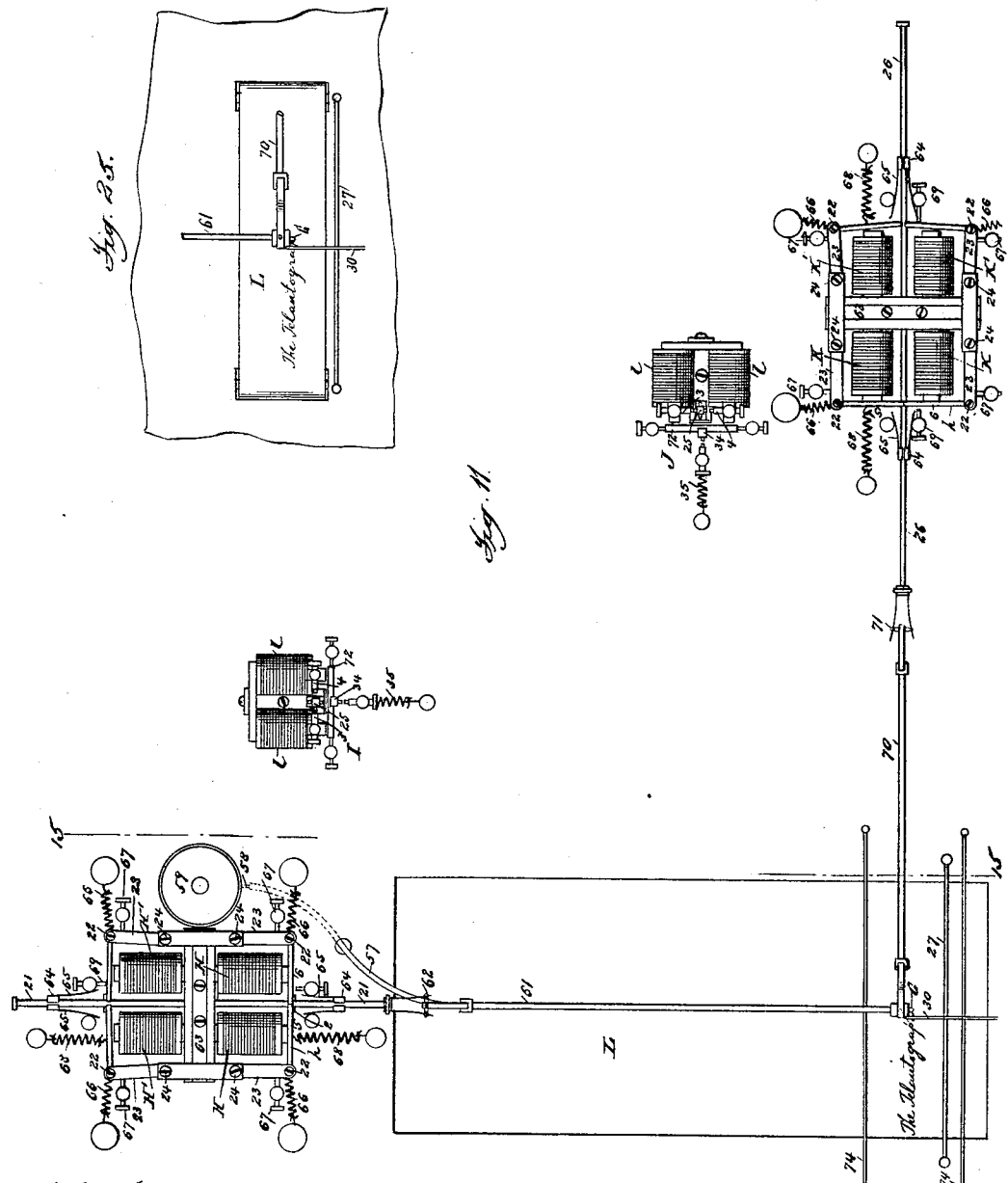

(No Model.) 12 Sheets—Sheet 8.

E. GRAY.
TELAUTOGRAPH.

No. 386,815. Patented July 31, 1888.

(No Model.) 12 Sheets—Sheet 9.
E. GRAY.
TELAUTOGRAPH.
No. 386,815. Patented July 31, 1888.
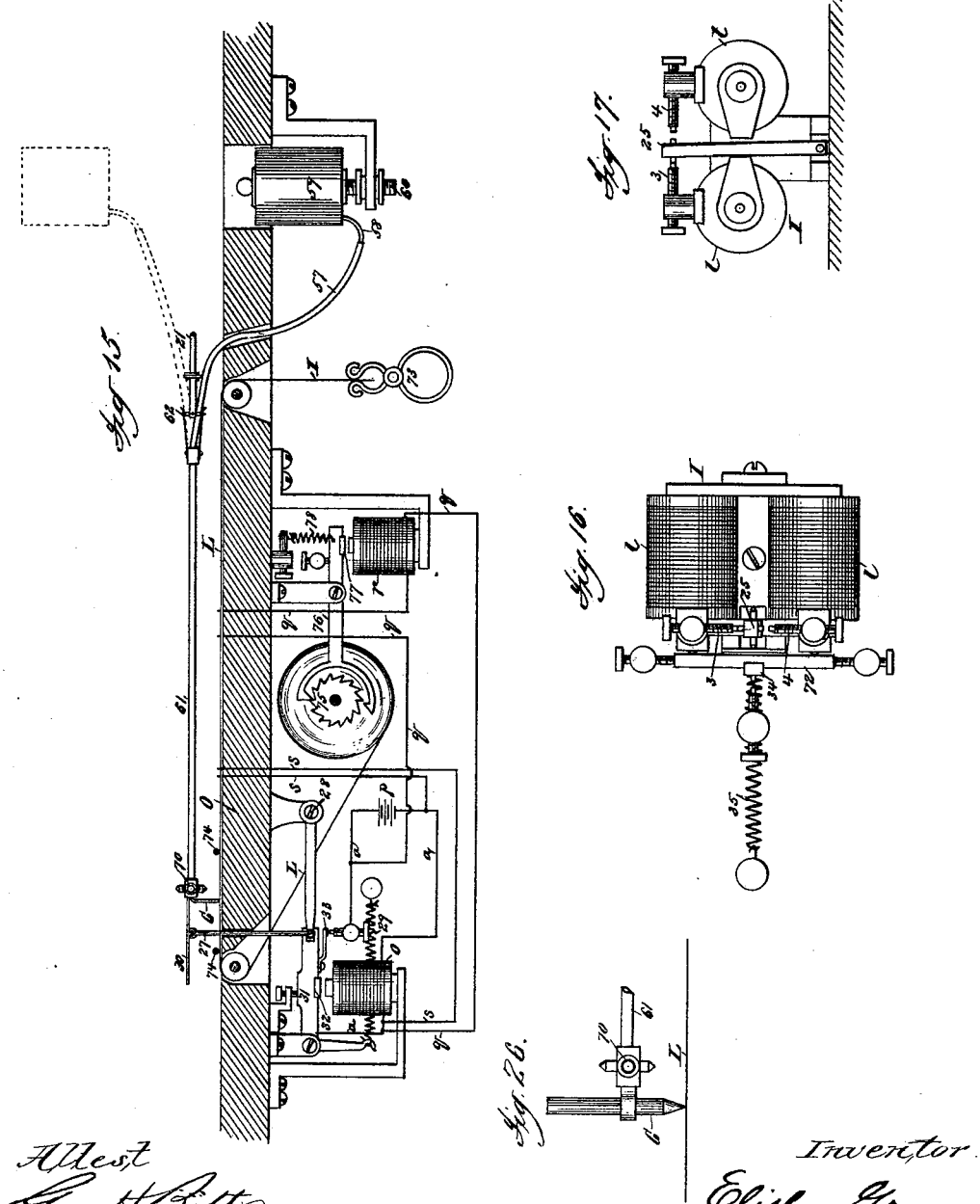

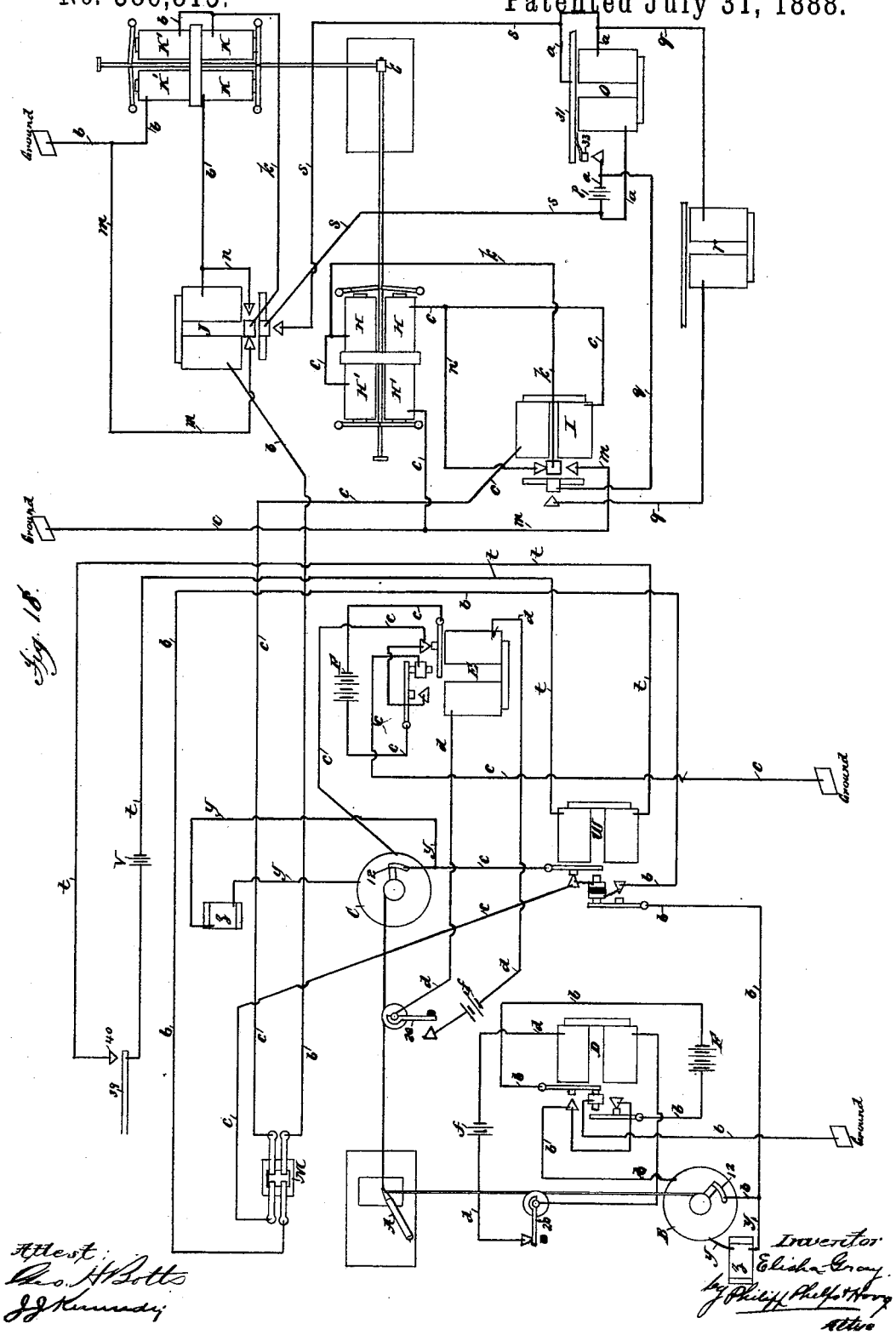

(No Model.)  12 Sheets—Sheet 11.
E. GRAY.
TELAUTOGRAPH.
No. 386,815. Patented July 31, 1888.
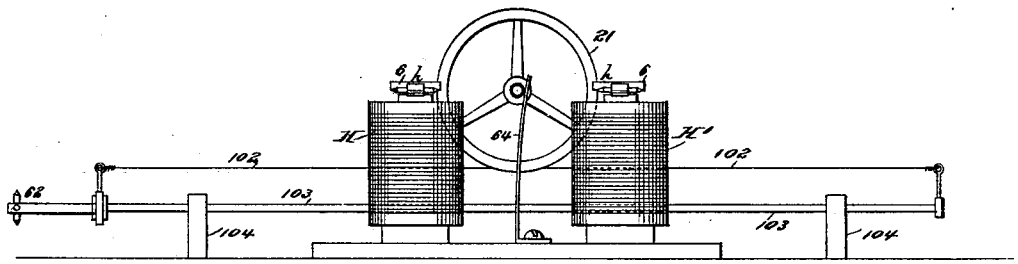
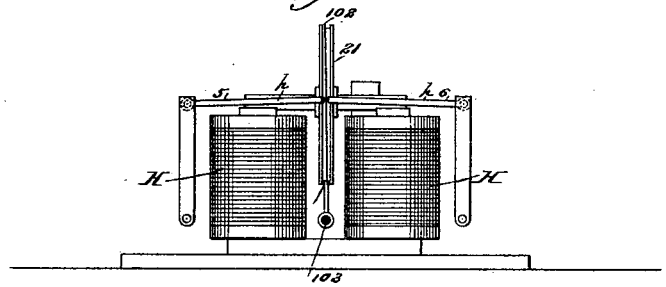
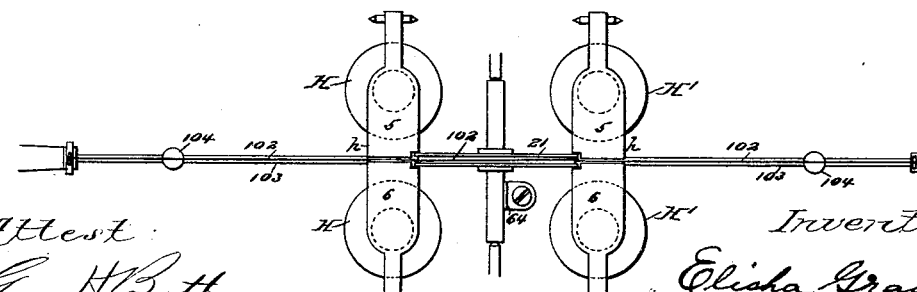

(No Model.)  12 Sheets—Sheet 12.
E. GRAY.
TELAUTOGRAPH.
No. 386,815. Patented July 31, 1888.
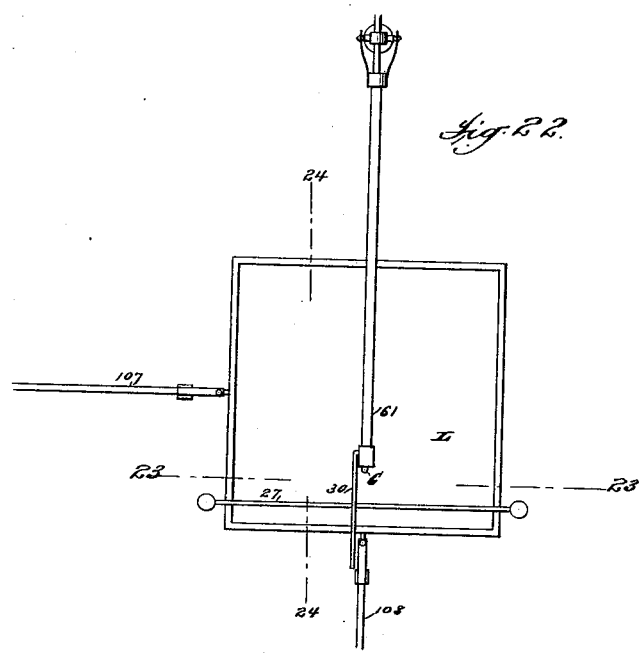
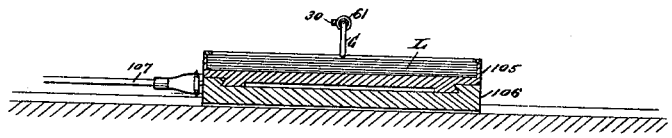
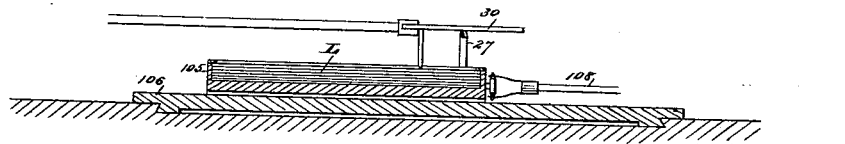
Attest:
Geo. H. Botts.
J. J. Kennedy
Inventor:
Elisha Gray
by Philipp Phelps & Hovey
Attys.

UNITED STATES PATENT OFFICE.

ELISHA GRAY, OF HIGHLAND PARK, ILLINOIS.

TELAUTOGRAPH.

SPECIFICATION forming part of Letters Patent No. 386,815, dated July 31, 1888.

Application filed June 13, 1888. Serial No. 276,921. (No model.)

*To all whom it may concern:*

Be it known that I, ELISHA GRAY, a citizen of the United States, residing at Highland Park, county of Lake, and State of Illinois, have invented certain new and useful Improvements in Telautographs, fully described and represented in the following specification and the accompanying drawings forming a part of the same.

This invention relates to a writing-telegraph of that class in which the act of writing the message at the sending station operates to reproduce it at the receiving-station.

In all the systems of telegraphy of this class which have been proposed prior to my invention the transmitting-instrument proper (herein for convenience called a "transmitting-pen") was moved by the operator to form the message, such movement varying the strength of the currents, according to the position of said transmitting-pen, in two electric circuits connected with electro-magnetic devices that moved the receiving-instrument proper, (herein called a "receiving-pen,") the extent of movement of said devices and through them the receiving-pen varying with the varying strengths of said currents. Some of the objections to said systems are as follows: Variations in the constancy of the batteries or other generators of the currents and in the strength of the currents, due to defective insulation, rain, and other causes, occurred, which caused aberrations in the movement of the receiving-pen, making the recording of a message uncertain and defective. The transmitting and receiving pens have been capable of only sufficient or slightly more than sufficient movement to produce a single character, the successive characters to make up the words and sentences being produced one after another in the same or substantially the same field. In order to cause the characters thus produced to take their proper places one after another to form the successive words, and also to assist in forming the characters, the paper upon which the message was written by the operator, if a copy of the message was to be preserved, was caused to move continuously beneath the pen by means of a feeding mechanism specially provided for that purpose and not under the control of the operator. From this it resulted that in order to produce characters of the proper form, and to cause them to take their proper positions in succession to form words and sentences, it was necessary for the operator to make allowance for the movement of the paper. To illustrate: If the operator formed his characters in too rapid succession, the second character would be reproduced before the paper upon which the message was being written had moved sufficiently far to carry the first character away from the receiving-pen, and the result would be that the two characters would overlap each other; or, if the operator formed his characters too slowly, they would be separated too far from each other. In addition to this, it was necessary for the operator to distort his characters in such manner and to such an extent that the movement of the paper beneath the pen would exactly or approximately correct such distortion and produce characters of the proper form, and the amount and character of the distortion necessary on the part of the operator was dependent upon and varied with the speed at which he wrote and the speed at which the paper moved. All of these things made it difficult to produce good results, and prevented the reproduction of the handwriting of the operator, and made it practically impossible for the systems to be operated except by trained operators. This continued movement of the paper by means not under the control of the operator, together with the limited range of movement of the transmitting and receiving pens, made it practically impossible to dot an "i" or cross a "t," or make corrections or alterations in a sentence or even in a word after it had been written, and thus made it necessary, if a mistake was made, to rewrite the whole matter, and this again resulted in trouble, because there was no means of erasing the erroneous matter. These difficulties, and others not enumerated, in telegraphs of this class which have been proposed prior to my invention were in the way of their being used practically for transmitting pictures, drawings, maps, or diagrams, or such characters as Hebrew or Chinese, or those employed in short-hand writing, which in order to be of value or to be distinguished and read must be made with at least comparative accuracy.

I overcome these difficulties by my invention, which consists in the combinations of instrumentalities which will be hereinafter described and claimed.

I have shown in the drawings a system and instrumentalities for carrying out my invention, which I term a "telautograph," and which I shall now describe.

In order that the detailed description of the construction, organization, and operation of the instruments and the system embodying the invention, which will be hereinafter given, may be more readily understood, a brief outline of the system will be first given.

The system consists, primarily, of two instruments, a transmitting-instrument and a receiving-instrument, herein termed "transmitter" and "receiver." The transmitter and receiver are provided with transmitting and receiving pens which can be moved over fields of considerable extent. If the system is designed for transmitting messages in writing, the fields will be equal in one direction to the length of a line of writing and in the other direction to the distance above and below the line occupied by any character. The transmitting-pen is connected to operate circuit making and breaking devices, termed "interrupters," located in two electric circuits and arranged to interrupt the currents passing over the respective circuits at short intervals, producing pulsations therein as the pen is moved in two directions crosswise of each other in forming characters, the number of pulsations in the respective circuits being determined by the distance which the pen is moved in the respective directions. These two circuits pass through the receiver and include electro-motors, also hereinafter termed "receiving-magnets," the armatures of which act through suitable connections to impart a step-by-step movement to the receiving-pen in two directions crosswise of each other, the number of steps in each direction being determined by the number of times the respective circuits are interrupted. By this means the movements of the transmitting-pen in the two directions operate through the interruptions in the currents passing over the circuits to impart corresponding movements to the receiving-pen, and thus reproduce the matter written or traced by the operator.

Co-operating with the receiver or forming a part thereof is a means for supporting a recording-surface, upon which the message is reproduced. This recording-surface, which will usually be paper, and will therefore be herein termed "paper," may be either in the form of a continuous ribbon or strip or in the form of a pad or a detached sheet. The receiver is also provided with means, which is under control of the operator at the transmitter, for shifting the paper after the completion of each line of writing, so as to bring it in proper position to receive the next line, and so on. In the preferred organization of the system the paper is stationary during the writing and is shifted after the completion of each line; but this may be reversed, the pen being stationary and the necessary movements to form the characters being imparted to the paper; or the movement in one direction may be imparted to the paper and in the other direction to the pen. In any case, however, the paper is not fed continuously and independently of the control of the operator during the writing, but is only moved in conformity to the movements of the transmitting-pen. From this it results that the reproduction is in the handwriting of the operator, and that the operator can pause at any point and for any length of time, and upon recommencing the writing the receiving-pen will continue the record from the point where it was interrupted, and also that the operator can go back in the line and make a correction, addition, or erasure at any point. The operator is also permitted to write at irregular speeds and is relieved from the necessity of distorting his writing.

The system is provided with connections by which whenever the transmitting-pen is raised slightly, the same as in raising a pen or pencil from the paper in ordinary writing, the receiving-pen is correspondingly raised, and vice versa. By this means, when the end of a line is reached and the transmitting-pen is moved back to commence a new line, or when it is necessary to go back in the line to make a change, or when it is desired to disconnect letters or words, it is only necessary to raise the transmitting-pen in the ordinary way in order to prevent the receiving-pen from making a continuous mark, and thus marring the record.

The system thus briefly outlined will now be described more in detail, reference being had to the accompanying drawings, in which—

Figure 6:
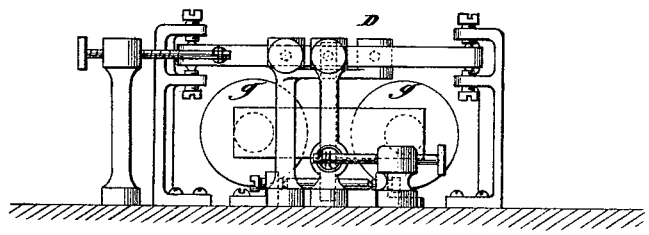
Figure 12:
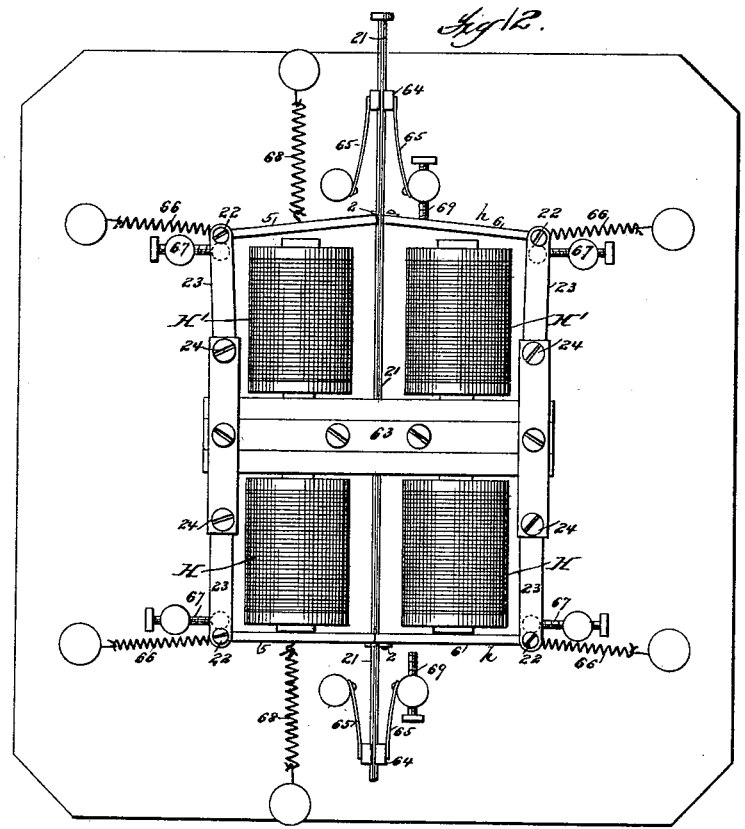
Figure 13:
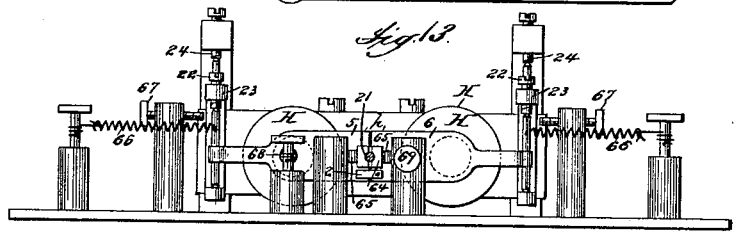
Figure 14:
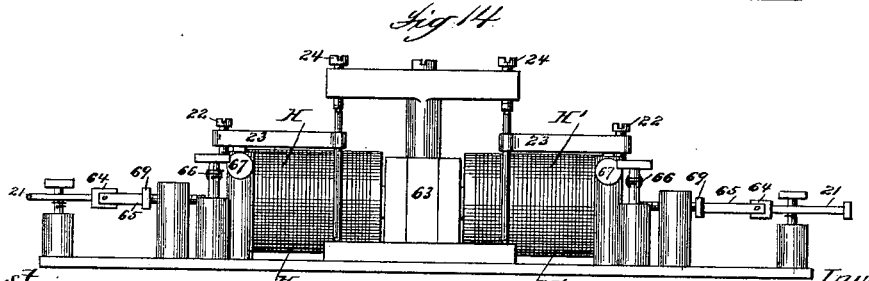

Figure 1 is a plan view of the transmitter. Fig. 2 is a vertical section of the same, taken on the line 2 of Fig. 1. Fig. 3 is an enlarged plan view of one of the interrupters and the parts immediately connected therewith. Fig. 4 is a sectional elevation of the same. Fig. 5 is an enlarged plan view of one of the pole-changers. Fig. 6 is an elevation of the same. Fig. 7 is an enlarged plan view of a pair of reversely-arranged temporary circuit-breakers, the purpose of which will be hereinafter explained. Fig. 8 is an elevation of the same. Fig. 9 is an enlarged plan view of a pen-rack for receiving the transmitting-pen when it is not in use, showing also a switch mechanism for connecting the receiver or transmitter at any station with the line-wires. Fig. 10 is an elevation of the same. Fig. 11 is a plan view of the receiver. Fig. 12 is an enlarged plan view of one pair of the receiving-magnets. Fig. 13 is an end elevation of the same. Fig. 14 is a side elevation of the same. Fig. 15 is a vertical section taken on the line 15 of Fig. 11. Fig. 16 is an enlarged plan view of one of the polarized relays. Fig. 17 is an end view of the same with certain parts removed. Fig. 18 is a diagram showing the electrical connections through which the system is operated. Figs. 19, 20, and 21 are views illustrating a modified arrangement of the receiving-magnets, Fig. 19 being a side elevation, Fig. 20 an end elevation, and Fig. 21 a plan view. Figs. 22, 23, and 24 are views illustrating a means of imparting a movement to the paper corresponding to the movements imparted to the receiving-pen in the system, as illustrated in the other figures, Fig. 22 being a plan view, Fig. 23 a section taken on the line 23 of Fig. 22, and Fig. 24 a section taken on the line 24 of the same figure. Fig. 25 is a view indicating a modification of the form of recording-surface shown in Fig. 11, and Fig. 26 is a modification of the receiving-pen.

Referring now particularly to Figs. 1 to 10 and 18, the principal features of the transmitter will be described. This instrument consists, primarily, of the transmitting-pen A, which is moved by the operator to form the characters or other matter to be transmitted. This pen may be a simple handle of convenient form to be grasped by the operator and moved to describe the outlines of the characters; but as it will usually be desirable to preserve a copy of the message it will usually be a pencil or fountain-pen, and it is therefore termed a "pen;" but this term wherever used in a general sense is to be understood as including any writing-instrument or a simple handle, which can be moved to form the outlines of the characters.

The pen A is connected at its point to two cords or other flexible connections, 55 56, which extend horizontally crosswise to each other, and are connected to and operate the two circuit making and breaking devices B C, termed "interrupters," located in two electric circuits, $b$ $c$, termed "main circuits," and so arranged that as the pen A is moved from left to right and vice versa the circuit $b$ is interrupted or made and broken repeatedly in quick succession, producing pulsations therein varying in number with the linear extent of the movement of the pen A and varying in speed of succession with the rapidity of such movement, while as the pen is moved up and down in forming the characters the circuit $c$ is interrupted and pulsations produced therein in the same manner.

The two interrupters B C and their auxiliaries are exact duplicates, and a description of one will therefore apply to both.

Each of the cords 55 56 is connected to and wound upon a small drum (see Figs. 1, 3, and 4) upon a shaft, 9, to which one wire of the circuit is connected. The shaft 9 is provided with an arm, 10, the end of which carries a brush, 12, which sweeps in contact with the face of a metallic disk, 13, to which the other wire of the circuit is connected. The face of the disk over which the brush 12 sweeps is provided with a series of channels or cuts located in close proximity and containing pieces of insulating material, 8, so that as the brush sweeps over the face of the disk in either direction the current passing over the circuit in which the brush and disk are located will be interrupted or made and broken repeatedly in quick succession, the number and rapidity of the interruptions being determined by the extent and rapidity of the movement of the brush. Each of the shafts 9 is also provided with a second cord or wire, 14, which is wound upon the shaft in the direction the reverse of the cords 55 56, and is connected to a spring or other retractile, 15, the tendency of which is to unwind the cord 14 and wind the cord 55, (or 56, as the case may be.) Each of the cords 55 56 passes between guides 16, located between the pen and the shafts 9, and the cords are provided with stops 17, which engage with the guides 16 and arrest the cords and limit the movement given to the shafts 9 and brushes 12 by the springs 15.

The transmitting-instrument is provided with two local circuits, $d$, which include local batteries $f$ and the electro-magnets $g$ of a pair of pole-changers, D E, (see Figs. 1, 5, 6, and 18,) which are located, respectively, in the main circuits $b$ $c$, and which act for a purpose, which will be hereinafter explained, to automatically change the polarity of the currents passing over the respective circuits whenever the movement of the transmitting-pen in either direction is reversed.

The pole-changers D E are of any of the common and well-known forms, and are connected to the two poles of the main batteries F and to the two wires of the respective main circuits $b$ $c$ in the usual manner. For the purpose of operating the pole changers the cords 55 56 pass around pulleys 18, (see Figs. 1, 3, and 4,) mounted upon shafts 19, which operate circuit makers and breakers included in the respective local circuits $d$. For this purpose the shafts 19 are provided with arms 20, which are frictionally connected to the shafts and have a limited movement between fixed stops 7. The arms 20 and one of the stops 7 of each arm are included in the respective local circuits, so that the rocking of the arms between their stops operates to make and break the local circuits, and thus operate the pole-changers to change the polarity of the currents passing over the main circuits $b$ $c$ at each vibration of the arms.

The operation of the transmitter as thus far described is as follows: The operator will take the pen A in his hand and form the characters in proper sequence in the usual manner, moving the pen up and down and from left to right in forming the characters and writing the line, the same as in ordinary writing. As the pen makes the downstrokes in forming the characters, the cord 56 will be unwound from the shaft 9 of the interrupter C, thereby revolving the shaft and moving the brush 12 over the disk 13, and interrupting the current over the circuit $c$ repeatedly and in quick succession, the number and rapidity of the interruptions being determined by the speed and extent of the movement of the pen.

As the pen makes the upstrokes the spring 15 will rewind the cord 56 and move the brush 12 in the reverse direction, interrupting the current in the same manner. So long as the up or down movement of the pen continues the cord 56, acting upon the pulley 18, will hold the arm 20 against one of the stops 7, and the local circuit $d$ will remain closed, (or broken, as the case may be,) so that the pole-changer E will not be operated, and the polarity of the current passing over the circuit $c$ will not be changed. As soon, however, as the movement of the pen is reversed—i. e., changed from up to down or down to up—the movement of the pulley 18 will be reversed and the arm 20 will be rocked against its other stop, thereby changing the condition of the local circuit $d$ and operating the pole-changer so as to change the polarity of the current passing over the circuit $c$, and this change in the polarity of the current will take place as often as the up-and-down movement of the pen is reversed. As the pen is moved from right to left and left to right, the cord 55 and the spring 15 will operate the brush 12 of the interrupter B, to interrupt the current over the circuit $b$ in the same manner, and the cord 55, acting on the pulley 18, will act to close or break the other local circuit $d$, and thus operate the pole-changer D to change the polarity of the current passing over the circuit $b$ whenever the movement of the pen is reversed, the same as described in connection with the pole changer E.

It is to be remarked that the construction and arrangement of the circuit makers and breakers formed by the arms 20 may of course be widely changed without departing from the invention, and it is also to be understood that the brushes 12 may be stationary and the disks 13 moved in contact with the brushes, if preferred.

Referring now particularly to Figs. 11 to 18, the principal features of the receiver will be described. This instrument consists, primarily, of the receiving-pen G, which may be a writing-instrument of any suitable form for recording the message. The term "pen" as applied to this instrument is therefore to be understood as including any form of writing-instrument. In the case shown a fountain pen is employed, which is composed of a tube of very fine or capillary bore having its end formed into a writing-point. This pen is connected by a piece of flexible-rubber tubing 57 with a capillary tube, 58, which enters an ink-well, 59, preferably located in such position that the surface of the ink in the well will be upon a lower level than the point of the pen.

To maintain the well at the proper height as the ink is lowered by use, it is provided with an adjusting-screw, 60. By locating the ink-well below the point of the pen it is found that the ink will be properly supplied to the pen by the capillary action of the pen and the tube 58, while if the well is located above the pen there is danger of the ink flowing too freely. The well may, however, be so arranged that the ink will flow to the pen by gravity, an arrangement to this end being shown in dotted lines at Fig. 15, suitable means being provided for regulating its flow; or the ink may be otherwise supplied to the pen. The pen is carried upon the end of an arm, 61, which is preferably tubular to receive the tube 57, and is connected by a universal joint, 62, to the end of a rod, 21, which is free to move longitudinally in a bearing, 63, but is retained in any position to which it is moved by means of frictional jaws 64, which are carried by light spring-arms 65, and act to grip the rod with sufficient force to prevent its accidental movement, and also to overcome its inertia and arrest and hold it at the end of each step of its movement, as will be presently explained.

Located adjacent to the rod 21 are a pair of reversely-arranged receiving electro-magnets, H H', which are included in the circuit $c$ and are provided with armatures $h$, which are arranged to act upon the rod 21 in such manner as to impart a step-by-step movement to the rod in opposite directions, according as one or the other of the magnets is energized. For this purpose the armatures $h$ are divided at their centers, so as to form two parts, 5 6, which are connected at their outer ends to pivots 22, so as to be capable of swinging to and from the cores of the magnets. The pivots 22 are in turn supported in frames 23, which are connected to pivots 24 in such manner as to swing laterally, and thus carry the two parts 5 6 of the armatures to and from each other. The frames 23 are provided with springs 66, the tendency of which is to draw the two parts of the armatures away from each other, the movement of the parts in this direction being limited by back-stops 67. The movement of the two parts of the armatures away from the cores of the magnets is effected by means of a spring, 68, connected to one of the parts, the part not connected to the spring being provided with a lip, 2, of non-magnetic substance, which engages with the other part. The movement of the armatures in this direction is limited by an adjustable back-stop, 69. The rod 21 and the magnets H H' and their armatures are so arranged that the rod passes between the adjacent ends of the two parts 5 6 of each armature in such manner that when the two parts of either armature are moved toward each other they will act to grip the rod between them, and, being then moved toward the magnet, they will carry the rod with them and impart a corresponding movement to the pen G.

The operation of the receiving-magnets H H' and their armatures is as follows: Whenever the magnet H is energized by the closing of the circuit $c$, in which it is located, the two parts of its armature will be attracted toward each other and toward the cores of the magnet. The springs 66 are so adjusted as to be slightly weaker than the spring 68, so that upon the magnet becoming energized and thus magnetizing the two parts of the armature they will move toward each other and grip the rod in advance of being moved toward the magnet. After gripping the rod, the two parts of the armature will move toward the magnet, thereby imparting a corresponding movement to the rod. As soon as the magnet is de-energized by the interrupting of the current over the circuit c, the springs 66 will draw the two parts of the armature apart, thereby releasing the rod, and the spring 68 will draw the parts back against the back-stop 69. This operation will be repeated as often as the current over the circuit c is interrupted, so as to energize and de-energize the magnet H, and thus the rod 21 and the pen G will be moved with a step-by-step movement, the number and rapidity of the steps being determined by the number and rapidity of the interruptions in the current over the circuit c. The movement thus given to the pen G will constitute the upward movement of the pen in forming the characters. Whenever the magnet H' is energized and de-energized, the same operation will take place, except that the rod 21 and the pen will be moved in the reverse direction. From this it will readily be seen that in order to cause the up and down movements of the receiving-pen G to conform to the corresponding movements of the transmitting-pen A it is only necessary to cause the interruptions in the circuit c, occasioned by the movement of the brush 12 as the transmitting-pen is moved upward, to de-energize and energize the magnet H, and the interruptions in the same circuit, occasioned by the reverse movement of the brush as the transmitting-pen is moved in the reverse direction, to de-energize and energize the magnet H'. To effect this the circuit c, which, as before stated, includes both the magnets H H', also includes the magnet $l$ of a polarized relay, I, (see Figs. 11, 16, 17, and 18,) the polarized armature 25 of which is connected by a wire, $k$, with the circuit c between the magnets H H', while the contact-points 3 4, between which the armature vibrates, are connected to wires $m$ $n$, which respectively connect with the circuit c beyond the magnet H' and between the magnet H and the relay.

The relay I is so organized that the polarity of the current passing over the circuit c while the transmitting-pen is moving upward will cause the magnet $l$ to vibrate the polarized armature 25 into contact with the point 3. The current passing over the circuit c will then pass through the magnet H and over the wire $k$, armature 25, and wire $m$, thus short-circuiting the magnet H' and leaving the magnet H to be energized and de-energized, and thus move the receiving-pen G in the same direction. As soon, however, as the movement of the transmitting-pen is reversed the polarity of the current passing over the circuit will, as before explained, be changed, and this will cause the magnet $l$ to vibrate the armature 25 against the point 4. The current will then pass over the wire $n$, armature 25, wire $k$, and through the magnet H', thus short-circuiting the magnet H and correspondingly reversing the movement of the pen G. By this means the receiving-pen is caused to reproduce the up and down movements of the transmitting-pen.

At some suitable point, preferably near the pen G, the rod 61 is pivotally connected to a rod, 70, which is connected by a universal joint, 71, to a rod, 26, which extends in a direction crosswise of the rod 21, preferably at or substantially at right angles thereto. Located adjacent to the rod 26 are two receiving-magnets, K K', which are included in the circuit $b$, and are provided with armatures $h$, which are arranged and act upon rod 26 in exactly the same manner as the armatures of the magnets H H' act upon the rod 21, so that the energizing and de-energizing of the magnet K operates through its armature to move the rod 26 and the pen G from left to right, while the energizing and de-energizing of the magnet K' operates in a similar manner to move the pen in the reverse direction. The circuit $b$ is provided with a polarized relay, J, similar to the relay I, which is arranged and acts to short-circuit one or the other of the magnets K K' whenever the polarity of the current passing over the circuit $b$ is changed, the same as described in connection with the circuit c. The relay J is so arranged that so long as the transmitting-pen is moved from left to right the current passing over the circuit $b$ will pass through the magnet K and act to move the receiving-pen in the corresponding direction, and that when the movement of the transmitting-pen is reversed and the polarity of the current changed the current will pass through the magnet K' and act to reverse the movement of the receiving-pen.

It has now been explained how the movement of the transmitting-pen along or at right angles to the line upon which the message is being written in either direction will cause the receiving-pen to move in the same direction, the movements of the latter pen being made up of a series of short steps. From this it follows that any movement of the transmitting pen in any direction oblique to the line or intermediate these two directions will cause the receiving-pen to move in a corresponding direction, but with a compound movement made up of a number of steps taken at right angles to or crosswise of each other, the relative number of steps in each direction depending upon the obliquity of the direction in which the transmitting-pen is moved. By this means the receiving-pen is caused to substantially follow any movement of the transmitting-pen, and thus reproduce a substantial fac-simile of whatever is written or traced by the latter.

The irregular or wavy character of the oblique lines made by the receiving-pen will not detract materially from the appearance of the writing, and will not be sufficiently marked to prevent the handwriting of the person at the transmitting-instrument from being readily recognized. The length of the steps with which the receiving-pen is moved may be varied considerably; but the receiver will preferably be so adjusted that the pen will take from seventy-five to one hundred steps to the inch.

If it is desired that the characters formed by the receiving-pen shall correspond in size to those formed by the transmitting-pen, the receiver will be so adjusted that the receiving-pen will at each interruption of one of the circuits be moved a distance equal to the movement of the transmitting-pen required to effect the interruption. By changing the relative movements of the two pens the reproduction may be enlarged or reduced.

It has already been stated that it is important that the receiving-pen should be so under the control of the operator at the transmitter that when he desires to break the connection between letters or words in the message or to go back along the line for the purpose of making an addition, correction, or interlineation, or when he has completed one line and wishes to move the transmitting-pen back to the point to commence a new line, the receiving-pen will make the corresponding movements without making any mark on the paper. To effect this, the system is so organized that the operator can when he desires cause the receiving-pen to be raised from the paper. The bore of the pen is so fine that no ink will flow from the pen except at such times as its point rests upon the paper, and thus when the pen is raised it will respond to the movements of the transmitting-pen without producing any mark. For this purpose the receiver is provided with a vertically-moving pen-rest, 27, (see Figs. 11 and 15,) which extends horizontally beneath the pen and is supported upon arms projecting from a rock-shaft, 28, and provided with a spring or other retractile, 29, by which it is normally held in position to raise the point of the pen slightly from the paper. The pen-rest 27 may be arranged to act upon the rod 61; but it will preferably be arranged to act upon a light extension, 30, projecting beyond the pen.

Acting upon the rest 27 is a pivotal arm, 31, which carries the armature 32 of an electro-magnet, $o$, of comparatively high resistance, which is included in a local circuit, $a$, which also includes a part of the arm 31, a circuit-closer, 33, carried by the arm, and a local battery, $p$. The local circuit $a$ is provided with a branch, $q$, which includes an electro-magnet, $r$, of comparatively low resistance, and also a vibrating circuit-closer, 34, (see Figs. 11 and 16,) operated by an armature, 72, which is acted upon by the magnet $l$ of the relay I. The circuit-closer 34 is also acted on by a spring, 35, which tends to move it to position to complete the circuit through the branch $q$. The circuit $a$ is also provided with a branch, $s$, which includes a reversely-acting circuit-closer, 34, which is similarly arranged with relation to the magnet $l$ of the relay J.

The transmitter is provided with a yielding table or platform, 36, (see Fig. 2,) which is located directly beneath the point of the transmitting-pen and extends over the entire range of movement of the pen. This table is supported upon arms 37, which are pivoted at 38, so as to permit the table to yield slightly when the point of the pen A is brought down upon it with a pressure equal or about equal to the pressure exerted upon a pen or pencil in ordinary writing. One of the arms 37 is provided with a forward extension, 39, which plays between stops 40 42, which limit the movement of the table, and is provided with a spring, 41, the tendency of which is to normally hold the table in its raised position, with the arm 39 out of contact with the stop 40. The stop 40 and the arm 39 form a circuit-closer, which is included in a local circuit, $t$, which includes a local battery, $v$, and an electro-magnet, $w$. The armature 43 of the magnet $w$ (see Figs. 1, 7, and 8) is secured to a pivoted lever, 44, which is normally held against a back-stop, 45, by a spring, 46, and carries upon its opposite sides two contact-points, 47 48, which are insulated from each other. Located upon opposite sides of the lever 44 are a pair of pivoted levers, 49 50, which are provided with springs 51, which act to normally hold the lever 49 in engagement with the contact-point 47 and in close proximity to but not in engagement with a back-stop, 52, and the lever 50 in engagement with a similar back-stop, 54, and in close proximity to but not in engagement with the contact-point 48. Each of the levers 49 50 is provided with an adjustable weight, 53, by which the inertia of the levers can be increased or diminished to any desired extent to secure the proper operation of the levers, as will be hereinafter explained. The lever 49, contact-point 47, and back-stop 52 are included in the main circuit $b$, while the lever 50, contact-point 48, and back-stop 54 are included in the main circuit $c$. The levers 49 50 form reversely-acting temporary circuit-breakers for the respective circuits $b$ $c$, as will presently appear.

The operation of this part of the system is as follows: When the parts are in their normal position—that is to say, when the transmitting-pen is not in use—the spring 41 will hold the table 36 in its raised position and the arm 39 out of engagement with the stop 40, so as to break the local circuit $t$ and de energize the magnet $w$. So long as the magnet $w$ is not energized the lever 44 will be held against its back-stop 45, and the lever 49 will remain in engagement with the contact-point 47, so as to close the circuit $b$ at that point, and the lever 50 will remain in engagement with the back-stop 54, so as to also close the circuit $c$ at that point. So long as both the circuits $b$ $c$ remain closed the magnets $l$ of the relays I J will both be energized, so as to attract their armatures and rock the circuit-closers 34 into position to break the connection through both of the branches $q$ $s$, and the pen-rest 27, being then raised so as to raise the arm 31, the circuit closer 33 will be operated to break the local circuit $a$ and de-energize the magnet o, and the spring 29 will hold the pen-rest in its raised position, so as to raise the pen G from the paper and hold it in that position, and this will continue as long as the table 36 remains in its raised position. When it is desired to commence the transmission of a message, the operator takes the transmitting-pen in his hand, and, moving it to the proper position to commence the writing, places the point against the table 36 and forms the characters with the same pressure on the pen as in ordinary writing. The pressure of the pen against the table acts to depress the table so as to rock the arm 39 against the stop 40 and close the local circuit t. This will energize the magnet w so as to rock the lever 44 and cause the contact-point 48 to strike against the free end of the lever 50, and the blow thus given to the lever will cause it to swing away from both the contact-point 48 and the back-stop 54, and thus temporarily break the main circuit c. The spring 51 will, however, act to very quickly overcome the inertia of the lever and its weight 53 and swing it back against the contact-point 48, and thus again close the circuit c. The break thus made in the circuit c will be of exceedingly short duration; but the time between the breaking and closing of the circuit may be regulated with great nicety by adjusting the position of the weight 53 so as to cause the lever to swing a greater or less distance. As the lever 44 is rocked by the movement of the armature 43, as just described, the lever 49 will follow the movement of the lever 44 until it engages with its back-stop 52, so that the main circuit b will not be broken. The temporary breaking of the circuit c, caused by the swinging of the lever 50, will operate to de-energize the magnet l of the relay I and permit its circuit closer 34 to be rocked by its spring 35, so as to close the local circuit a through the branch q. This will cause the current from the battery p to pass through the magnets o r; but the magnet o being of high resistance and the magnet r of low resistance the former will alone be energized, thereby rocking the arm 31 and depressing the pen-rest 27, so as to lower the point of the pen G onto the paper. As soon as the arm 31 is thus rocked the circuit-closer 33 will close the circuit a, so as to short-circuit the magnet r and circuit-closer 34, and the magnet o will remain energized, so as to hold the pen-rest depressed until de-energized by the raising of the transmitting-pen, as will be presently explained. As soon as the circuit c is closed by the return of the lever 50 against the contact-point 48 the magnet l of the relay I will be re-energized, and the circuit-closer 34 will be rocked, so as to break the connection through the branch q. Whenever the operator desires to break the connection between words or characters or to go back along the line for any purpose, or, having completed one line, wishes to commence a new one, he has only to raise the transmitting-pen off the table 36, the same as in ordinary writing.

As soon as the pen is raised from the table 36 the spring 41, acting upon the arm 39, will raise the table and at the same time rock the arm 39, so as to break the local circuit t. This will de-energize the magnet w and release the armature 43, so as to permit the lever 44 to be rocked back against its back-stop 45, and as the lever 44 is thus rocked it will strike the end of the lever 49 and swing it, the same as has been described in connection with the lever 50, so as to temporarily break the circuit b, the circuit c remaining closed, the same as described in connection with the circuit b. This temporary breaking of the circuit b will operate to de-energize the magnet l of the relay J and permit its circuit-closer 34 to close the branch s and short-circuit, and thus de-energize, the magnet o, so as to release the arm 31 and permit the spring 29 to elevate the pen-rest 27 and raise the pen G from the paper, and at the same time operate the circuit-closer 33 to break the local circuit a. The pen G will then respond to the movement of the transmitting-pen, as already described, but without making any record upon the paper. The transmitting and receiving pens having been moved to the position where it is desired to recommence the writing, the operator has only to depress the point of the transmitting-pen against the table 36 and the receiving-pen will be lowered onto the paper, as already described. In order to prevent the magnets of the relays I J from being entirely de-energized, so as to release their armatures and thus allow the circuit-closers 34 to close the branches q s each time the circuits b c are interrupted by the movement of the brushes 12 over the disks 13, the springs 35 are so adjusted that the amount of energy required to overcome their tension is much less than the energy required to operate the armatures h of the receiving-magnets H H' K K', and the main circuits b c are provided with shunt-circuits y, which connect with the main circuits upon opposite sides of the interrupters, and include resistance-coils or other resistances, z, which are so adjusted as to allow a constant current to pass over the main circuits sufficient to energize the magnets l to overcome the springs 35, but not sufficient to operate the armatures h. It is to be understood, therefore, that when the circuits b c are referred to as being broken or interrupted by the interrupters B C it is not to be understood that those circuits are necessarily completely broken, so as to entirely stop the currents, but only that the currents are sufficiently interrupted to release the armatures of the receiving-magnets.

From the foregoing it will be seen that all of the movements required to form the individual letters or characters, and also to bring them in proper position one after another to form the words of a line, are made by the receiving-pen, the paper remaining stationary during the writing. When, however, one or more lines have been written, it is necessary that the paper should be shifted so as to bring a new portion into position to be written upon. If the message is to be written in the form of a single line extending along the length of a narrow ribbon of paper, the paper must be shifted longitudinally the length of the line which has been written, so that when the writing is resumed it will continue from the point on the paper where it was interrupted. If, on the other hand, the message is written in lines extending across a sheet or wide ribbon of paper, the paper must be shifted forward a distance equal to the space between one or more lines. In either case it is important that the mechanism for shifting the paper in the receiver should be under the control of the operator at the transmitter.

As herein illustrated, the message is written in the receiver upon a wide ribbon of paper, L, which is supported at rest upon a stationary paper-support, O, while the writing is in progress. The paper L is led from a roll, and after passing over the support O, beneath the point of the pen, passes downward out of the instrument, where it is attached to a clip, 73, of sufficient weight to maintain it at the proper tension and to draw it off the roll when the latter is permitted to turn. Suitable guides, as 74, will preferably be provided to hold the paper smoothly and evenly beneath the pen. The roll upon which the paper is wound is provided at one end with an escapement-wheel, 75, which is controlled by an escapement-lever, 76, to which is attached the armature 77 of the magnet $r$, the lever 76 being so arranged that when rocked by the action of the magnet it will permit one tooth of the escapement-wheel to pass and the weight 73 to unwind and shift the paper L. The escapement-lever 76 is provided with a spring or other retractile, 78, which, as soon as the magnet $r$ is de-energized, will rock the lever in the opposite direction, and thus permit another tooth to pass and the paper to be again shifted. The movement thus given to the paper each time the magnet $r$ is energized and de-energized is equal to the space between two lines.

It has already been explained that whenever the circuit $c$ is temporarily broken by the action of the lever 50 the current from the local battery $p$ is caused to pass through the magnet $r$, but without energizing it. If, however, both the circuits $b\ c$ are simultaneously broken, the branches $q\ s$ of the local circuit $a$ will both be closed and the current from the battery $p$ will pass over the wires $a\ q\ s$ and through the magnet $r$ without passing through the magnet $o$, and the result will be that the magnet $r$ will become energized, so as to attract its armature and rock the escapement-lever 76 to allow the paper L to be shifted, as described.

For the purpose of simultaneously breaking both the circuits $b\ c$ to effect the shifting of the paper L when desired, the transmitting-instrument is provided with a circuit-breaker, M, (see Fig. 2,) by which the operator can when he desires break both the circuits $b\ c$ simultaneously. For this purpose the circuits $b\ c$ include contact-springs or brushes 79, which rest upon a pair of metallic blocks, 80, set in a head, 81, of insulating material, which is carried upon a shaft, 82, having a handle, 83, which is in convenient position to be moved by the operator. The shaft 82 is acted on by a spring or other retractile, 84, which normally holds the shaft and head 81 in such position that the blocks 80 connect the brushes 79 and close the circuits $b\ c$. By operating the handle 83, however, the shaft can be given a partial turn, so as to carry the blocks 80 out from under the brushes 79, and thus break both the circuits and effect the shifting of the paper L, as described.

In the practical operation of the system it will usually be desirable to make a copy or duplicate of the message at the sending-station, and for this purpose the transmitter is provided with a wide ribbon of paper, N, similar to the paper used in the receiver, which is also supported at rest while the writing is in progress. The paper N is led from a roll and passes forward over the table 36 beneath the transmitting-pen, and after passing over a roll, 85, mounted upon the shaft 38, is led from the instrument. A guide, as 86, will preferably be provided, which will operate to hold the paper smoothly beneath the pen. To effect the shifting of the paper N, the roll 85 is provided with a small co operating spring-pressed roll, 87, which is journaled in the arms 37, and between which and the roll 85 the paper passes. The roll 85 is provided with a ratchet, 88, which is engaged by a pawl, 89, carried upon one end of a lever, 90, the other end of which is connected by a rod, 91, with an arm, 92, upon the shaft 82 in such manner that whenever the handle 83 is operated to break the circuits $b\ c$ and effect the shifting of the paper L the pawl 89 will also be operated to shift the paper N a corresponding distance.

The general operation of the system is as follows: The instruments having been supplied with the paper L N, the operator will take the transmitting-pen and, holding it out of contact with the paper N, move it to the point over the paper where he desires to commence the writing of the message. As the transmitting pen is thus moved, one or both of the brushes 12 will be moved, so as to interrupt one or both of the circuits $b\ c$, and thus, through the magnets H H' K K' and their armatures, move the receiving-pen to a corresponding position over the paper L, the receiving-pen being raised out of contact with the paper by the pen-lifter 27. The operator will then place the point of the transmitting-pen upon the paper, as in ordinary writing, and as soon as the transmitting-pen is pressed upon the paper the table 36 will be depressed, thereby closing the local circuit $t$ and through the connections which have been described depressing the pen-rest 27, so as to lower the pen G onto the paper. The operator will then write along the line in the usual manner, and the movements of the transmitting-pen in forming the characters and in moving along the line will operate the brushes 12 to interrupt the circuits $b$ $c$ and the arms 20 to change the polarity of the currents passing over the circuits, and thus energize and de-energize the respective magnets H H' K K' and cause the receiving-pen to follow the movements of the transmitting-pen with a step-by step movement, and thus reproduce the message. If at any point in the line the operator wishes to break the connection between characters or words or to go back on the line to make an addition or correction, he will raise the transmitting-pen from the paper. This will allow the table 36 to be raised and break the local circuit $t$, and through the connections which have been described de-energize the magnet $o$ and allow the pen-rest 27 to raise the receiving-pen from its paper. By then moving the transmitting-pen to the desired position and lowering it onto the paper the receiving-pen will be moved to and lowered onto the paper in a corresponding position. At the end of a line the operation will be the same. When a line has been completed and it is desired to commence a new line, the operator will, either before or after moving the transmitting-pen into position to commence the new line, operate the handle 83, so as to shift the paper N and at the same time break both the circuits $b$ $c$, and this will through the connections which have been described energize the magnet $r$ and operate the escapement to correspondingly shift the paper L.

In a practical embodiment of the system it will usually be necessary to have a transmitter and a receiver located at each station, so that messages can be both sent and received at any station, and in such case it will of course be desirable to utilize the line-wires of the circuits $b$ $c$ for both sending and receiving. This can readily be done by providing a switch apparatus at each station, by which the transmitter and receiver can be switched into and cut out of the circuits at pleasure. One form of switch apparatus suitable for this purpose is illustrated in the present case. For this purpose the line-wires of the circuits $b$ $c$ (see Figs. 9 and 10) are connected to spring contacts or brushes 93, which rest upon the periphery of a rotary switch, 94, having two pairs of contact-blocks, 95 96, which are connected, respectively, to wires $b$ $c$ which lead to the receiver, and to wires $b$ $c$ which lead to the transmitter. By turning the switch 94 until the brushes 93 rest upon the blocks 95 the receiver will be switched into the circuits and the transmitter cut out, and vice versa. In the practical operation of the system it is also important that means should be provided which will make it certain that the receiver at any station will be switched into the circuits at all times, except when the transmitter at that station is in use. To insure this, the shaft 97, upon which the switch 94 is carried, is provided with a socket, 98, which is adapted to receive the one end of the transmitting-pen, and the instrument is provided with a stationary fork, 99, which is adapted to receive and support the other end of the pen. The fork 99 is so positioned that when one end of the pen is inserted into the socket 98 and the other end rests in the fork the switch 94 will be in position to connect the receiver to the line-wires of the circuits. By this means it is only necessary for the operator when he has finished using the pen to place it in the pen rack or receiver formed by the socket and fork to insure the proper connection of the receiver to the circuits, and a glance at the transmitter will show at any time whether or not the proper connection exists. This feature is of particular importance when the system is employed for ordinary business purposes and is not operated by specially skilled operators. Whenever the transmitting-pen is removed from the pen-rack, it will usually be for the purpose of transmitting a message, and in such case it is of course necessary to shift the switch 94 so as to connect the transmitter to the line-wires. To effect this automatically, the shaft 97 is provided with an arm, 100, which is acted on by a spring or other retractile, 101, in such manner that when the shaft is released by the lifting of the pen from the rack the spring will act to shift the switch into position to connect the transmitter with the line-wires and maintain that connection until the switch is again shifted by the replacing of the pen in the rack.

Modifications may be made in many of the details of the system, and still it would contain my invention. A few of the more general modifications which may be made will be referred to.

The receiving-pen may in some cases consist of a simple pencil or tracer, as indicated at Fig. 26, and in such cases the apparatus for supplying the ink to the pen will be dispensed with. In some cases it may be preferred to write the message in the form of a single line extending along the length of a narrow ribbon of paper, as indicated at Fig. 25, and in such cases it will only be necessary to arrange the mechanism for shifting the paper so that the paper will be shifted in the direction of the length of the line and operate the handle 83 a sufficient number of times to shift the paper the length of a line. If, in addition to transmitting messages in writing, it should be desired to capacitate the system to transmit and reproduce diagrams, maps, or pictures, all that is necessary is to allow the transmitting and receiving pens to have the necessary range of movement in each direction. The closing and breaking of the local circuit $t$ to lower and raise the receiving-pen may be effected by a special key, instead of by the transmitting-pen, or by a circuit-closer arranged and operated in any suitable way. The paper L, instead of being shifted by a weight controlled by an escapement, may be shifted in any other desired manner, or the means for shifting the paper or raising the pen, or both, may be omitted. So, also, the means for holding the paper at rest during the writing operation may also be modified.

The rods 21 26, instead of being straight, may form the peripheries of segments or wheels, as shown in Figs. 19 to 21, the receiving-magnets being so positioned that their armatures will act upon the wheels to revolve them in reverse directions by gripping their peripheries. In such case as this the rotary motion of the wheel will of course have to be converted into reciprocating motion to be transmitted to the pen. This may be done in a variety of ways—as, for example, by means of a cord, 102, which passes around the wheel and is attached to the ends of a rod, 103, which moves in guides 104 and is connected by a universal joint to the rod or arm for moving the pen.

It has been stated that the movements necessary to reproduce the message, instead of being imparted to the receiving-pen, may be wholly or in part imparted to the paper. Figs. 22 to 24 illustrate one way in which this can be done. In this case the pen G is stationary and the paper L in the form of a sheet or pad of sheets is supported upon a small table, 105, which is arranged to move in a dovetail channel formed in a carriage, 106, which carriage is in turn arranged to move in a dovetail channel arranged crosswise of the first channel. The table 105 and carriage 106 are connected, respectively, to and operated by arms 107 and 108, corresponding to and operated in the same manner as the arms 61 70, connected to the pen. This is, however, a simple reversal of the order of movement, and is to be considered as in a broad sense the equivalent of correspondingly moving the pen. It is to be understood, therefore, that whenever the paper is referred to as "stationary" or "at rest" that term only means that the paper has no independent feeding-movement while the writing is in progress, and it is also to be understood that when the movement of the receiving-pen is referred to as forming the characters that also includes the equivalent movement of the paper.

Instead of the electromotors or receiving-magnets herein described any electromotor that can be operated by pulsations of substantially the same effective strength in an electric circuit to move the receiving-pen, as described, or which will transmute such pulsations into the described movements of said pen, may be used.

It is to be understood that the terms "character," "writing," and "message," as herein used, include any matter, such as pictures, maps, drawings, diagrams, and arbitrary characters of all kinds, as well as ordinary and short-hand writing; also, that the term "paper" includes any surface suitable for receiving writing or from which writing or printing already made is to be traced.

As will be seen from the above description, in transmitting and recording a character I transmute the movement of the transmitting-pen into pulsations of substantially the same effective strength in an electric circuit, varying in number with the linear extent of the movement of said pen, and varying in speed of succession with the rapidity of such movement, by wholly or partially interrupting the current, and I transmute such pulsations into movements of the receiving-pen.

By pulsations of substantially the same effective strength I mean that they are the effects produced by wholly or partially interrupting a current in an electric circuit, the strength of such current in such circuit between such interruptions being sufficient to operate the electromotor and the interruptions preventing such current from operating such motor whether the strength of the current changes or not, being thus radically different from the electrical effects employed in electrical writing-instruments proposed prior to my invention, in which the effective strength of the current in the circuit is purposely constantly varied by increments added to or taken from said current, which latter continuously operates the motor during the operation of writing, an example of such an instrument being set forth in United States Letters Patent No. 217,588.

Some of the advantages resulting from the employment of my invention, hereinafter claimed, are the following: Variations in the constancy of the batteries or other generators of the currents and in the strength of the currents, due to defective insulation, rain, and other causes, do not affect the movements of the receiving-pen. Both the transmitting and receiving pens are capable of sufficient movement to produce not only a single character, but successive characters, to make up words and sentences or other matter upon stationary paper wholly by the movements of the said pens and in the hand-writing of the operator, as in ordinary writing. After characters, words, or other matter have been written and reproduced, erasures, corrections, insertions, changes, or additions can be made to such matter, at the will of the operator.

I do not herein claim the methods hereinbefore described, as they form the subject-matter of an application made by me for United States Letters Patent, Serial No. 275,593, filed May 31, 1888; nor do I claim herein the electromotor alone, as that forms the subject-matter of another application made by me for United States Letters Patent, Serial No. 278,895, filed July 3, 1888.

What I claim is—

1. The combination, with a transmitting-pen, of an electric circuit, an interrupter operated through said pen and producing pulsations of substantially the same effective strength in said circuit, varying in number with the linear extent of the movement of said pen and varying in speed of succession with the rapidity of said movement, an electromotor operated through said pulsations, and a receiving-pen controlled by said motor, substantially as set forth.

2. The combination, with a transmitting-pen, of two electric circuits, two interrupters operated, respectively, through the movement of said pen in two directions crosswise of each other and producing two series of electric pulsations in said circuits, the pulsations of each series being of substantially the same effective strength and varying, respectively, in number with the linear extent of the movement of said pen in said crosswise directions and in speed of succession with the rapidity of said movement, two electromotors included in the respective circuits and operated, respectively, through said two series of pulsations, and a receiving-pen controlled by said two motors in two directions crosswise of each other, substantially as set forth.

3. The combination, with a transmitting-pen, of an electric circuit, an interrupter operated through said pen and producing pulsations of substantially the same effective strength in said circuit, varying in number with the linear extent of the movement of said pen and varying in speed of succession with the rapidity of said movement, an electromotor operated through said pulsations, a receiving-pen controlled by said motor, and a stationary recording-surface over which said receiving-pen is moved, substantially as set forth.

4. The combination, with a transmitting-pen, of an electric circuit, an interrupter operated through said pen and producing pulsations of substantially the same effective strength in said circuit, varying in number with the linear extent of the movement of said pen and varying in speed of succession with the rapidity of said movement, an electromotor operated through said pulsations, a stationary recording-surface over which said receiving-pen is moved, a circuit-controller and feeding mechanism for shifting the position of the said recording surface when the reproduction of the characters is suspended, substantially as set forth.

5. The combination, with a transmitting-pen, of an electric circuit, an interrupter operated through said pen and producing pulsations of substantially the same effective strength in said circuit, varying in number with the linear extent of the movement of said pen and varying in speed of succession with the rapidity of said movement, an electromotor operated through said pulsations, a receiving-pen controlled by said motor, and a pen-rest for lifting said receiving-pen, substantially as set forth.

6. The combination, with a transmitting-pen, of an electric circuit, an interrupter operated through said pen and producing pulsations of substantially the same effective strength in an electric circuit, varying in number with the linear extent of the movement of said pen and varying in speed of succession with the rapidity of said movement, an electromotor operated through said pulsations, a receiving-pen controlled by said motor, and a circuit-changer for changing the condition of the current in said circuit when the movement of the transmitting-pen is reversed, substantially as set forth.

7. The combination, with a transmitting-pen, of an interrupter operated through said pen and producing pulsations in an electric circuit varying in number with the linear extent of the movement of said pen and varying in speed of successions with the rapidity of said movement, an electromotor operated through said pulsations, a receiving-pen controlled by said motor, and a pole-changer for changing the polarity of the current in said circuit when the movement of the transmitting-pen is reversed, substantially as set forth.

8. The combination, with an electric circuit including an interrupter and receiving-magnets, which are respectively energized by different conditions of the current over the circuit, of a transmitting-pen connected to operate said interrupter to interrupt the circuit, a circuit changer for changing the condition of the current over the circuit whenever the movement of the pen is reversed, and a receiving-pen moved in two directions through the action of said receiving-magnets, substantially as set forth.

9. The combination, with two electric circuits, each including an interrupter producing pulsations of substantially the same effective strength, and receiving-magnets which are respectively energized by different conditions of the currents over the circuits, of a transmitting-pen connected to operate said respective interrupters by its movements in directions crosswise of each other, circuit-changers for changing the condition of the currents over the respective circuits whenever the movement of the pen in either direction is reversed, and a receiving-pen moved in two directions crosswise of each other through the action of the magnets of the respective circuits and in opposite directions by the respective magnets of each circuit, substantially as set forth.

10. The combination, with a main circuit, including a pole-changer, an interrupter, receiving-magnets, and a polarized relay arranged to direct the current through one or the other of the magnets, according to its polarity, of a transmitting-pen connected to operate said interrupter, a local circuit including the magnet of the pole-changer, and a circuit maker and breaker, which is also connected to and operated by the pen to change the condition of the local circuit, and thereby change the polarity of the current over the main circuit when the movement of the pen is reversed, and a receiving-pen moved in two directions through the action of the said magnets, substantially as set forth.

11. The combination, with two main circuits, each including a pole changer, an interrupter, receiving-magnets, and a polarized relay arranged to direct the current through one or the other of the magnets, according to its polarity, of a transmitting-pen connected to operate said interrupters by its movements in two directions crosswise of each other, two local circuits each including the magnet of one of the pole-changers, and a circuit maker and breaker, which is also connected to and operated by the pen to change the condition of its local circuit, and thereby change the polarity of the current over the corresponding main circuit when the movement of the pen in either direction is reversed, and a receiving-pen moved in two directions crosswise of each other through the action of the magnets of the respective circuits and in opposite directions through the action of the respective magnets of each circuit, substantially as set forth.

12. The combination, with the receiving-pen and a main circuit, $b$ or $c$, including a receiving-magnet for operating the pen, of the brush 12 and disk 13, also included in the circuit, the transmitting-pen, and connections with the transmitting-pen for moving the brush or disk, one with relation to the other, to interrupt the circuit repeatedly by the continued movement of the pen in one direction, substantially as set forth.

13. The combination, with the receiving-pen and a main circuit, $b$ or $c$, including receiving-magnets for moving the pen in opposite directions, of the brush 12 and disk 13, also included in the circuit, the transmitting-pen, and connections with the transmitting-pen for moving the brush or disk, one with relation to the other, to interrupt the circuit repeatedly by the continued movement of the pen in one direction, and a retractile, 15, for effecting the same result when the pen is moved in the reverse direction, substantially as set forth.

14. The combination, with the receiving-pen and the circuits $b$ $c$, including receiving-magnets for moving the pen in two directions crosswise of each other, of a brush, 12, and disk 13, included in each circuit, the transmitting-pen, and connections with the transmitting-pen for moving the brush or disk of each circuit, one with relation to the other, to interrupt the respective circuits repeatedly by the continued movement of the pen in two directions crosswise of each other, substantially as set forth.

15. The combination, with a main circuit, $b$ or $c$, a transmitting-pen, and means for interrupting the circuit by the movement of the transmitting-pen, of a receiving-magnet included in the circuit and having a two-part armature, each part of which is pivoted to move in two directions, a rod acted on and moved with a step-by-step movement by the armature, and a receiving-pen connected to and moved by the rod, substantially as set forth.

16. The combination, with two receiving-magnets having two-part armatures, each part of which is pivoted to move in two directions, and means for interrupting the currents through the magnets by the movement of a transmitting-pen, of a rod arranged to be acted on and moved with a step-by-step movement in opposite directions by the respective armatures, and a receiving-pen connected to and moved in opposite directions by said rod, substantially as set forth.

17. The combination, with two pairs of receiving magnets, each having a two-part armature, each part of which is pivoted to move in two directions, and means for interrupting the currents through the magnets by the movement of a transmitting-pen, of two rods arranged to be acted on and moved with step-by-step movements in opposite directions by the respective armatures of the respective pairs of magnets, and a receiving-pen connected to and moved in two directions crosswise of each other by said rods, substantially as set forth.

18. The combination, with a pair of receiving-magnets having two-part armatures pivoted to move in two directions, and means for interrupting the currents through the magnets by the movement of a transmitting-pen, of a rod arranged to be gripped and moved in opposite directions by the respective armatures, friction-jaws acting upon the rod, and a receiving-pen connected to and moved in opposite directions by the rod, substantially as described.

19. The combination, with the receiving-pen G, having a fine or capillary bore located above the recording-surface, of the ink-well located at a lower level than the point of the pen, and a flexible tube connecting the pen and ink-well, substantially as set forth.

20. The combination, with the receiving-pen having a fine or capillary bore located above the recording-surface, of the ink-well having a fine or capillary discharge-tube and located at a lower level than the point of the pen, and a flexible tube connecting the pen and the discharge-tube of the ink-well, substantially as set forth.

21. The combination, with the transmitting and receiving pens, of a pen-rest for raising the pen from the paper, an electro-magnet controlling the position of the pen-rest, electrical connections having a circuit-controller at the transmitter for energizing and de-energizing said magnet, and a movable table beneath the transmitting-pen for operating said circuit-controller, substantially as set forth.

22. The combination, with the receiving-pen and the main circuits $b$ $c$, through which it is operated, of an electro-magnet, $o$, for controlling the position of the pen, a local circuit including said magnet and reversely-acting circuit-closers, electro-magnets $l$, included in the respective main circuits and controlling said circuit-closers, reversely-acting temporary circuit-breakers located in the respective main circuits, a local circuit including an electromagnet for operating said circuit-breakers, and a circuit-controller included in said last local circuit and controlled by the position of the transmitting-pen, substantially as set forth.

23. The combination, with the receiving-pen having a movement in two directions crosswise of each other, of a stationary recording-surface over which the pen moves to reproduce the message, a feeding mechanism for shifting the recording-surface at times when the writing is suspended, an electro-magnet for controlling said feeding mechanism, and electrical connections including said magnet, and a circuit maker and breaker at the transmitter, whereby the operator at the transmitter can control the shifting of the paper in the receiver, substantially as set forth.

24. The combination, with the receiving pen having a movement in two directions crosswise of each other, of a stationary recording-surface over which the pen moves to reproduce the message, an escapement and escapement-lever for effecting the shifting of the recording-surface at times when the writing is suspended, an electro-magnet for operating said escapement-lever, and electrical connections including said magnet, and a circuit maker and breaker at the transmitter, whereby the operator at the transmitter can control the shifting of the paper in the receiver, substantially as set forth.

25. The combination, with the receiving-pen, the recording surface upon which it acts, and a feeding mechanism for shifting said recording-surface when the writing is suspended, of an electro-magnet for controlling said feeding mechanism, a local circuit including said magnet, and circuit-closing devices for energizing and de-energizing said magnet to control the feeding mechanism, substantially as set forth.

26. The combination, with the receiving-pen and the main circuits $b$ $c$, through which it is operated, of a recording-surface upon which the pen acts, and a feeding mechanism for shifting said recording-surface when the writing is suspended, an electro-magnet for controlling said feeding mechanism, a local circuit including said magnet, and circuit-closing devices for energizing and de-energizing said magnet to control the feeding mechanism, electro-magnets included in the main circuits for controlling said circuit-closing devices, and circuit making and breaking devices included in the main circuits at the transmitter for energizing and de-energizing said magnets, substantially as set forth.

27. In a telautograph system, the combination, with a transmitter and a receiver located at one station and the electrical connections constituting the line to another station, of a switch for connecting either the transmitter or the receiver to the line, and a pen rack or receiver connected to the switch and operated by the placing of the pen therein to shift the switch and connect the receiver to the line, substantially as set forth.

28. In a telautograph system, the combination, with a transmitter and a receiver located at one station and the electrical connections constituting the line to another station, of a switch for connecting either the transmitter or the receiver to the line, and a pen rack or receiver connected to the switch and operated by the placing of the pen therein to shift the switch and connect the receiver to the line, and a retractile for automatically shifting the switch to connect the transmitter to the line when the pen is removed, substantially as set forth.

In testimony whereof I have hereunto set my hand in the presence of two subscribing witnesses.

ELISHA GRAY.

Witnesses:
ROBT. V. HUGHES,
JAMES W. ORMES.